Figure 1:
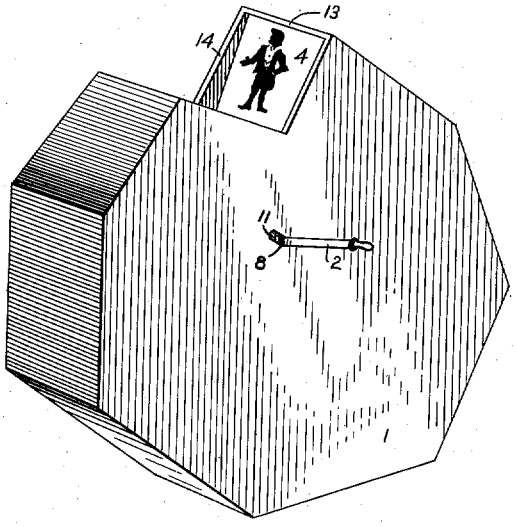

F. S. CHANCE.

PICTURE DISPLAYING DEVICE.

No. 11,650. Reissued Feb. 15, 1898.

Witnesses

R. D. Hawkins.

Jula Green

Inventor

Frank S. Chance

By P. H. Lockwood

His Attorney.

UNITED STATES PATENT OFFICE.

FRANK S. CHANCE, OF INDIANAPOLIS, INDIANA.

PICTURE-DISPLAYING DEVICE.

SPECIFICATION forming part of Reissued Letters Patent No. 11,650, dated February 15, 1898.

Original No. 591,452, dated October 12, 1897. Application for reissue filed December 1, 1897. Serial No. 660,449.

*To all whom it may concern:*

Be it known that I, FRANK S. CHANCE, of Indianapolis, in the county of Marion and State of Indiana, have invented certain new and useful Improvements in Picture-Displaying Devices; and I do hereby declare the following to be a full, clear, and exact description of the invention, that will enable others skilled in the art to which it appertains to make and use the same, reference being had to the accompanying drawings, and to the figures of reference marked thereon, which form a part of this specification.

My invention relates to an improved device for consecutively displaying a series of pictures with sufficient rapidity to give to the figures in the picture the appearance of moving.

The object of my invention is to provide a device of that class that will be simple in operation, cheap of manufacture, and adapted to be made of such size as to permit of its being carried in the pocket.

A leading feature of my invention consists in rigidly securing one end of the picture-sheets tangentially to the drum or roller, whereby the bending of the sheet when held by the detaining piece or shoulder will be distributed throughout the whole sheet rather equally. By this, too, greatly additional springiness or tension is given to the sheets, whereby when released by the detainer they move very quickly into the position for inspection; also, by reason of this tangential attachment of the sheets to the roller or drum greater curvature is given to the sheets before they are released by the detainer, so that the outer ends of the sheets under the detainer are comparatively farther apart from each other in succession, whereby there is no chance for more than one sheet at a time to escape from the detainer.

Another feature of the invention consists in the arrangement and construction of the case and the combination therewith of the picture-sheets tangentially secured to the drum or roller. By reason of this tangential arrangement I am enabled to turn the pictures away from the observer, having the detainer at the front end of the display-opening and a stop at the other end of the display-opening, whereby the sheet while the picture is being displayed will be straight instead of curved. It is obvious that while the sheet is curved the picture is poorly presented to the observer; but with my invention the sheet extends straight from its tangential attachment at one end to the stop at the other end, and thereby the best effect is obtained.

A further object is to provide an inexpensive means in a device of the class described for securing the sheets evenly upon the central roller or shaft and in such a manner as to give the desired effect when they are rotated, a means for rotating said central shaft, and a means for causing each succeeding picture to instantaneously take the place of the preceding picture, and to allow each picture as it appears to stop long enough for the image to become fixed upon the retina of the eye.

With these objects in view my invention consists in the construction and combination of parts shown in the accompanying drawings, described in the following specification, and more particularly pointed out in the claims.

Figure 2:
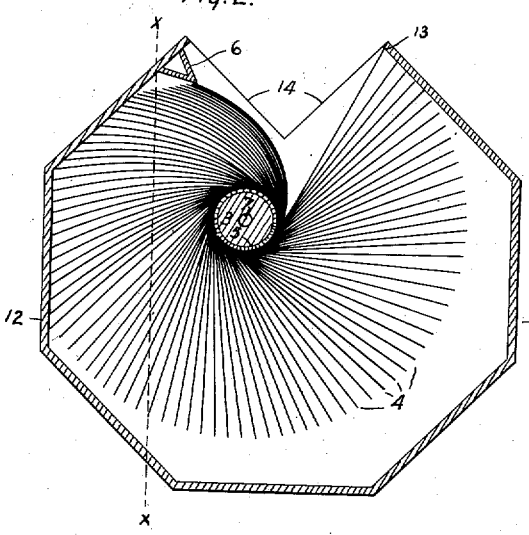
Figure 3:
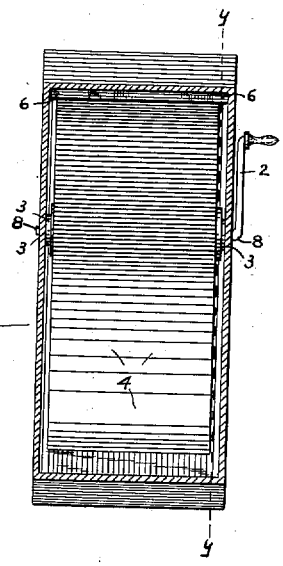
Figure 4:
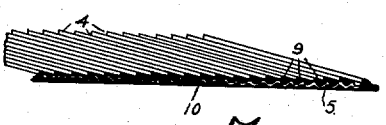

In the drawings, Figure 1 is a perspective view of my device. Fig. 2 is a sectional view taken on the line $y\ y$ of Fig. 3. Fig. 3 is a sectional view taken on the line $x\ x$ of Fig. 2; and Fig. 4 is a fragmentary view illustrating the method of securing the sheets to the fabric, said fabric in turn secured to the shaft.

1 is the case.

2 is the crank.

3 is a central shaft, drum, or roller.

4 are picture-sheets.

5 is the fabric upon which the sheets are secured, and 6 is a detaining piece or shoulder to engage the outer edges of the sheets 4.

The case 1 may be made of any desired outline consistent with its purpose and is provided with a suitable display-opening 14 in its upper edge, here shown V-shaped, as seen from the sides, through which the pictures are viewed as they consecutively appear. The central shaft or roller 3 fits between the sides of the case 1 and has a central opening 7 throughout its length, through which the axle 8, which is a continuation of and integral with the crank 2, is adapted to pass. The shaft 3 may be of wood or other suitable material, and the fabric 5 is rolled around said shaft and secured with glue or like adhesive substance. The sheets 4 to be attached to the fabric are spread out, with the ends of each succeeding sheet overlapping the one beneath it, as shown in Fig. 4, thereby exposing the edge and a short section of the side of each sheet. Glue or other adhesive substance is then applied to the exposed portions 9 of the sheets and naturally fills up the slight depression caused by the thickness of each succeeding sheet. This glue is indicated by the black line 10 between the fabric 5 and sheets 4 in Fig. 4. The fabric 5, which has previously been cut to the proper width and length, is then placed upon the glued surface of the sheets and pressed, so it will adhere firmly. The fabric is then wrapped around the shaft 3, as above described. This wrapping causes the outer edges of the sheets 4 to spread out, as in Fig. 2, so that the sheets extend tangentially from the drum or roller. The axle 8 is journaled in the case 1 through openings 11. Said openings 11 are located on a line between the center of the case 1 and the detaining-point of the shoulder 6, slightly above said center, as may be seen in Figs. 1, 2, and 3 of the drawings. It will be observed that this has the effect of causing the outer edges of the sheets 4 to come in contact with the inside edge of the case 2 at 12, and as the shaft 3 is rotated the sheets are curved backward by reason of said contact until they come in contact with the detaining-shoulder 6, when the curvature is increased, thereby causing the sheets to spring rearward with great rapidity when they pass the shoulder 6, and as they strike the rear edge 13 of the display-opening 14, which serves as a stop, there is a short pause in the movement just sufficient to allow the image to become fixed in the retina of the eye, when the next sheet springs rearward and takes its place. While the sheet is thus exposed to view, it is straight. This being repeated as the entire series of pictures or views printed upon the sheets 4 pass through the opening in the case 1 the pictures have the appearance of movement—as, of walking, dancing, &c.

It will be understood that the series of views displayed in the case will be of the same object or objects in varied attitudes in order to give the above-described effects.

The device described may be made very cheaply by forming the case 1 of pasteboard and printing the pictures upon the sheets 4 from printing-plates. The method of securing the sheets 4 upon the roller 3 is inexpensive, yet places said sheets evenly in the position shown, which is essential to the proper working of the device. The axle 8 is fixed immovably in the opening 7 in the shaft 3. Therefore the shaft is rotated as the crank 2, which is integral with the axle 8, is turned. The instantaneous movement of the sheets carrying the pictures is effected by the shoulder 6 and by having the axle 8 mounted out of the center, as shown. Each sheet as it passes the shoulder 6 springs against the edge or stop 13 so quickly that the eye cannot follow it; but its short stop or dwell as it strikes the edge 13 enables the eye to catch the image and retain it until the next view is presented. In operation it is only necessary to turn the crank 2 slowly and evenly, when the effects above described will be attained.

I am aware that it is not new to present a series of views consecutively in order to give the moving effect, but I am not aware that the effects described have ever been produced by the means and in the manner employed in my device.

Having described my invention, what I claim, and desire to secure by Letters Patent of the United States, is—

1. A picture-displaying device including a rotatable drum or roller, and elastic picture-sheets rigidly secured at one end to the drum or roller tangentially, substantially as set forth.

2. A picture-displaying device including a series of picture-sheets placed adjacent to each other with slightly overlapping ends, a strip of flexible material secured to such overlapping ends, and a drum or roller about which the strip of flexible material is secured whereby the picture-sheets will extend therefrom tangentially, substantially as set forth.

3. A picture-displaying device including a case provided with a display-opening, a detaining-piece at one end of said opening, a stop at the other end thereof, and a series of picture-sheets rotatably mounted in such casing so that their outer ends will be temporarily held in succession by the detaining-piece and said stop as the device is operated, substantially as set forth.

4. A picture-displaying device including a series of picture-sheets, a drum or roller to which one end of the picture-sheets is secured tangentially, means for rotating the drum or roller, and a case in which the roller and picture-sheets are mounted having a display-opening with a projection at the front part of the case and a stop at the rear end of the display-opening that engage the outer end of the picture-sheets in succession as the device is operated and temporarily stop the same, substantially as set forth.

5. As an article of manufacture, a picture-displaying device having a case 1, provided with a V-shaped opening in the top thereof, the roller 3, having a fabric 5, to which are adhesively attached sheets 4, irremovably fixed thereon, said roller journaled in said case 1 by means of the axle 8, said axle being positioned slightly out of the center of said case for the purpose of bringing the outer edges of the sheets 4 into more decided contact with the shoulder 6, projecting inwardly from the front edge of the V-shaped opening in said case, substantially as set forth.

6. In a picture-displaying device of the class described, the combination of the case 1, having the V-shaped top opening 14, and the shoulder 6, projecting inwardly from the front edge of said V-shaped opening, with the roller 3, mounted upon the axle 8, adapted to be rotated by the crank 2, said axle 8, journaled in the case 1, through openings 11, said openings located slightly above the center on a line with said shoulder 6, and the sheets secured to the fabric 5, by means of adhesive substance, in the manner described, said fabric being in turn secured upon the roller 3, as set forth.

7. In a picture-displaying device, the combination of the case 1, provided with the inwardly-projecting shoulder 6 secured inside the case near the front edge of the opening formed therein, and having the V-shaped opening in the top thereof, with a series of sheets 4 mounted upon a fabric 5, the said fabric fixedly secured upon a roller 3, said roller 3 mounted upon an axle 8 fixed in the case 1, upon a line between the center of said case and the point of the shoulder 6, as shown and described.

8. The combination in a picture-diplaying device of the class described, of the case 1, having the V-shaped opening 14 in the upper part thereof, the inner depending shoulder 6, and the axle 8 mounted in said case 1, slightly above the center on a line with said shoulder 6, with the roller 3 fixedly mounted upon the axle 8, and having the fabric 5 carrying the adhesively-mounted sheets 4 fixedly secured thereon, as set forth.

In testimony whereof I affix my signature in presence of two witnesses.

FRANK S. CHANCE.

Witnesses:
V. H. LOCKWOOD,
ZULA GREEN.